UNITED STATES PATENT OFFICE.

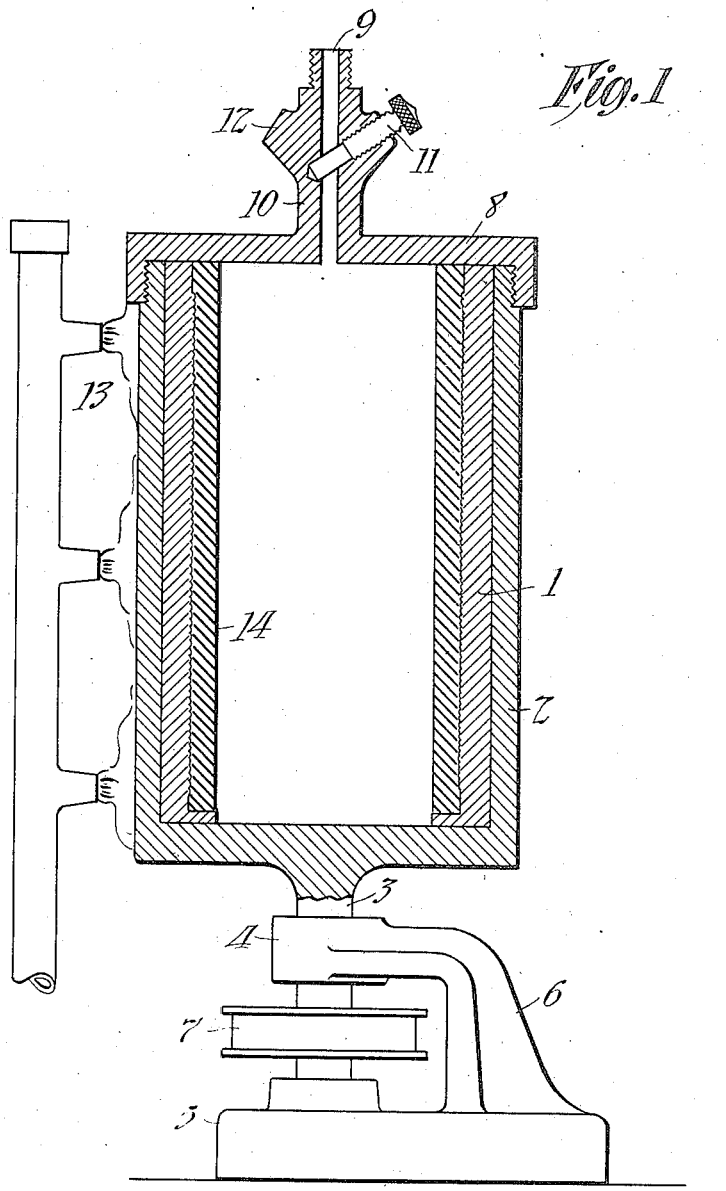

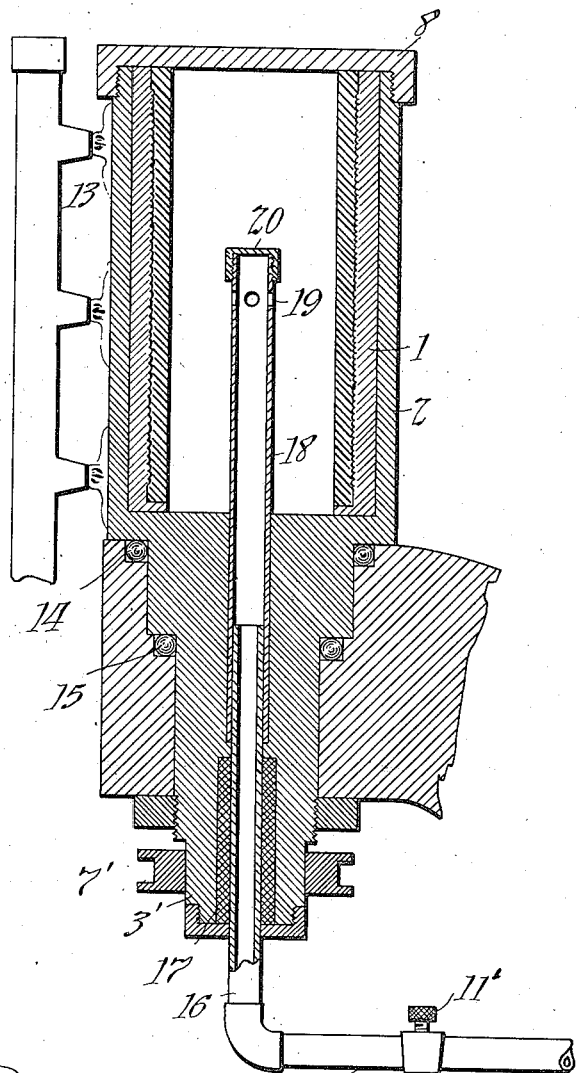

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

METHOD OF MOLDING DUPLICATE SOUND-RECORDS AND OTHER OBJECTS.

1,146,384.

Specification of Letters Patent.

Patented July 13, 1915.

Application filed May 1, 1909. Serial No. 493,258.

*To all whom it may concern:*

Be it known that I, JONAS W. AYLSWORTH, a citizen of the United States, and a resident of East Orange, in the county of Essex and State of New Jersey, have made a certain new and useful Invention in Methods of Molding Duplicate Sound-Records and other Objects, of which the following is a description.

The object of my invention is to provide a method of molding sound records and other objects from substances which are not adapted to be molded by the well known methods.

The invention relates more particularly to a method of molding substances which in their final stage are non-plastic at such temperatures as may be used without injury to the substance or the matrix.

By means of the method herein described, I am enabled to mold sound records, both cylindrical and disk, from such bodies as are produced when albumenoids and caseins are combined with formaldehyde or other aldehydes or equivalent substances, and the various non-plastic condensation products of phenols, their homologues, their polymers and derivatives. These bodies have not heretofore been successfully molded into sound records, but are adapted to form excellent sound records if successfully molded, because of their physical qualities, which are especially useful for the purpose. Heretofore, sound records or other objects could only be molded from such substances by molding the material in the earlier plastic stages of its formation and completing the reaction of formation in the matrix, whereby a more or less porous and bubbly mass resulted, or by molding the substances in a plastic incomplete state and subsequently treating the article with formaldehyde gas or liquid solution to harden the same. In both cases the resulting product was not suitable for sound records because of air or gas bubbles and imperfections of surface which caused foreign noises when the record thus formed was reproduced, and otherwise impaired the quality of the sound record. In the present invention, these defects are eliminated, and a sound record may be produced which is most refractory to the wearing action of the reproducing stylus, and which is not deteriorated by the effects of heat, moisture, handling and the action of the atmosphere thereon.

The invention may be practised in a number of ways.

Attention is hereby directed to the accompanying drawings, forming part of this specification, and representing apparatus in which my process may be carried out.

Figure 1 is an elevation, partly in section, of a suitable rotatable mold in which a cylindrical sound record may be formed according to the process disclosed in this application, and Fig. 2 is a similar view of modified apparatus adapted to the same purpose.

In carrying out the invention, ingredients such as albumenoids, caseins, gelatins, phenols and their polymers, etc., together with an aldehyde, such as formaldehyde or other substance containing the methylene radical $CH_2$, may be mixed together with a suitable condensing or catalytic agent and allowed to react with the application of heat to form a liquid or plastic mass, which is then introduced into a matrix such as that shown in either of the figures, in which final reaction by which the non-plastic final product is formed is caused to ensue with application of heat while the record is being molded. Or secondly, the body which it is intended to use as the basis of the substance, such as gelatin or casein mass, may be rendered plastic by water and heat and then introduced into the matrix, and formaldehyde or equivalent agent with or without a catalytic or condensing agent may be subsequently introduced, either in liquid or gaseous form into the matrix, and the matrix and its contents heated to hasten the completion of the condensation reaction and the equivalent polymerization or other hardening process, which results in the formation of the final non-plastic product. Or thirdly, a substance in liquid or plastic state may be introduced into the matrix together with a catalytic or other condensing agent, the substance so produced being of such a character that polymerization or equivalent hardening action of the substance to a non-plastic permanent state will be induced in the matrix by heat. As an example of the last mentioned process, a condensation product of phenol with an aldehyde or other methylene-containing substance may be formed by mixing a phenol, as the well known phenol, carbolic acid, $C_6H_5OH$, with an aldehyde such as formaldehyde, $CH_2O$, in equal molecular proportions and combined by heat and pressure, without the addition, however, of a catalytic or condensing agent. The product thus obtained should, to obtain the best results, be evaporated to remove excess of formaldehyde and water at a temperature not exceeding 280 degrees F., and the product obtained is soluble and plastic or may be rendered plastic by heat, and this is combined with a condensing or catalytic agent, and a small quantity of a polymerized aldehyde or other methylene-containing substance such as paraformaldehyde, both preferably in anhydrous condition, and properly mixed. Such a condensing agent may be either an acid or a basic substance. I prefer, however, to use small quantities of acid radicals or substances which will yield a free acid radical, such as pinene hydrochlorid, sublimed aluminium chlorid, stannic chlorid, etc., because of their rapid action. This condensing agent may be added to the mass at a relatively low temperature as by dissolving the mass in a volatile solvent and then adding the condensing agent and paraformaldehyde, whereupon the product may be poured into the matrix and subjected to subsequent heat treatment while the record is being formed.

In the first and third methods referred to above, a preliminary reaction is caused between the different ingredients before the same are introduced into the mold, the final reaction only taking place in the mold during the formation of the record by the molding process, whereas in the second of the three methods mentioned, the entire reaction between the ingredients takes place in the mold during the formation of the record. In all of these specific methods the final product is formed *in situ* in the mold in which the record or other object cast is formed by a centrifugal action, the process used being that commonly known as spinning.

By the method above outlined, the deleterious effects due to porosity because of the setting or hardening or changing from the plastic to the non-plastic state while the mass is evolving gases, may be prevented by the pressure exerted on the mass by the centrifugal action induced by the relatively high speeds at which the matrix is rotated. Such a process is described and claimed in my application No. 493,416, filed on even date herewith. In the application referred to, the force induced by the centrifugal action alone is depended upon to counteract the tension of dissociation of the mass being molded so that the formation of gas is prevented or retarded and minimized at the temperature necessary to rapidly perform the reaction. In this present application, in addition to the pressure developed by the centrifugal action of the molding process, a further and external pressure is also applied to the mass during the molding operation. This process will be useful where it is necessary to obtain greater pressure than is afforded by the centrifugal force of the rotating mass of material at the speed of rotation which is found desirable, or where it is desirable to increase the temperature and thus hasten the reaction without a further speeding up of the apparatus. This additional pressure may be obtained in either of two ways. It may be obtained by forcing a charge of compressed formaldehyde gas or equivalent agent into the mold, which is then sealed and the reaction carried out. This method is applicable in cases in which the formaldehyde or equivalent agent is introduced in the mold in a gaseous state, as it may be, for example, in the second of the three specific methods described above. Or secondly, in cases in which the formaldehyde or equivalent agent is introduced into the matrix in liquid form or into a liquid or plastic mass in which the formaldehyde or its equivalent has already been incorporated, pressure may be obtained by forcing a charge of compressed air into the mold, or by forcing into the mold a charge of any other compressed gas of such a character that it will not affect the reaction taking place therein. Or again, reaction might be allowed to take place in an uncovered mold placed in the pressure chamber in which pressure of the desired amount to reinforce that furnished by the centrifugal action may be developed.

Referring to the drawings, the mold 1 in Fig. 1 may be inserted within the rotatable container 2, which is integral with or secured to the spindle 3, which is adapted to be rotated within the bearings 4 and 5 of the casting 6. The mold may, of course, be rotated in either a vertical or a horizontal position, but I prefer to use the vertical method of spinning the mold by centrifugal action, because of the high speeds which may readily be secured by this method. The spindle 3 may be rotated by means of the belt wheel 7 secured to the spindle 3, over which a belt driven from any convenient source of power is adapted to be placed, or the spindle 3 may be rotated by an individual drive, as by the direct connection of some prime mover thereto, as is disclosed in application of Aylesworth and Aiken No. 495,301, filed May 11, 1909, upon which U. S. Patent No. 1,041,948 has been granted. After the material has been placed within the mold 1, the cap 8 is screwed or otherwise secured upon the container 2, and the charge of aldehyde or other compressed gas desired is introduced through passageway 9 formed in the tube 10, the passageway 9 being provided with a valve 11 for closing the same after the charge of gas has been introduced. The tube 10 may be provided with a counterweighted portion 12, if desirable, to counterbalance the valve 11 during the rotation of the mold. The container, the mold and its contents may be maintained at the desired temperature by any convenient means as by the burner 13. The record 14 is formed on the record surface of the mold 1 after the passageway 9 has been closed by the valve 11 by the centrifugal action induced by the high speed of rotation of the mold. During this operation the final reaction between the ingredients of the composition ensues, changing the same into a non-plastic body which, as in the case of the resinized phenol condensation products, may also be insoluble in all ordinary solvents except boiling concentrated sulfuric acid, and also infusible. Less time is consumed in the molding operation with the use of high temperatures during the final reaction, and also the greater will be the tendency to the evolution of gases, necessitating an increase of pressure to counteract the same as the temperatures are raised to lessen the time factor. Good results are obtained with the use of temperatures above 320 degrees F. in the case of the resinized phenol condensation products.

Referring to Fig. 2 of the drawings, a convenient form of apparatus for carrying out the above described processes are here disclosed. Here the mold 1 is placed within the container 2, which is formed integral with a spindle in the form of a stepped bearing 3', which may be driven by any convenient means as by the belt pulley 7'. The apparatus shown is arranged for a vertical spinning operation, the stepped spindle 3' being supported by any convenient means as the balls 14 and 15. The stepped spindle 3' is formed with a central passageway into which is inserted the end of the stationary pipe 16 by which the charge of compressed gas may be introduced, the supply of the same being regulated as by means of the valve 11'. The stepped spindle 3' is furnished with a stuffing box 17, which may be filled with any suitable packing material surrounding the stationary pipe 16. The pipe 18 is inserted within the central aperture through the stepped spindle 3' from above, in the manner illustrated, to rotate with the spindle 3' around the upper end of the pipe 16 above the stuffing box 17, thus affording a continuous passageway for the gas from the pipe 16 into the mold 1. The pipe 18 may be carried some distance above the bottom of the container 2, and furnished with perforations 19 for the exit of the gas into the mold 1, and with a cap 20 on its upper end to prevent any of the charge of material placed in the mold falling into the pipe 18.

As stated, excellent results have been obtained in my process with the use of both acid and basic substances as condensing agents. Small percentages of such substances as sodium hydroxid, lithium hydroxid, metallic oxids, and acid radicals may be used successfully.

When gelatins or other albuminoids are used, the substance may be soaked in cold water until it swells, when the excess of water is removed. The swelled gelatin is then heated until it melts and is poured hot into the mold and the aldehyde added. In the case of formaldehyde solution, the proportions of the latter may be varied between five and twenty per cent. of 40% solution of formaldehyde. The temperature of the mold is maintained in the case of such ingredients at about 212 degrees F during the hardening operation.

During the various reactions of the ingredients in the processes described, water is evolved and the reaction may be hastened in the case of the closed mold by absorbing the water vapors as they are given off. This may be done by connecting the mold with a suitable chamber in which a water absorbing substance is contained. Such substances as quick lime, zinc chlorid, phosphoric anhydrids or anhydrous copper sulfates may be used for this purpose.

In the case of the third specific method of combining the ingredients described above, the condensing agent may be added to a solution containing the initial or intermediate reaction product of the ingredients, which has been formed without the aid of a catalytic agent, or this intermediate product may be placed directly in the mold without the aid of a solution and the condensing agent added to the melted substance in the mold. Where the condensing agent is added to the ingredients dissolved in a volatile solvent as described, I have found good results to accrue from also adding more aldehyde on methylene containing substance to the solution, preferably in the form of paraformaldehyde or other solid aldehyde. I have found excellent results to accrue from the use of hydrochloric acid vapor or gas as a catalytic agent.

The process has so far been described in connection with the molding of cylindrical sound records. It is, however, obvious that it is also applicable to the formation of other symmetrical objects of such materials in which it is desirable that the vaporization of the mass, which would otherwise ensue during the reaction, should be counteracted. Also the method may be used in the formation of disk sound records by the use of a rotating mold such as that described and claimed in my application No. 493052 filed April 29, 1909, in which the molds for the disk records are secured to the periphery of a symmetrical chamber which is rotated about its axis, forcing the record material which is introduced into the molds into intimate contact with the same by centrifugal force and thus forming the record. Of course, it is obvious also that other objects besides disk sound records might easily be manufactured in the same manner.

Having now described my invention, what I claim and desire to protect by Letters Patent is as follows:

1. The method of molding sound records and other objects of substances non-plastic in their final condition, consisting in introducing into a suitable rotatable mold ingredients which react to form substances which in their final stage are non-plastic at such temperatures as may be employed without injury to the substance or mold, subjecting the substance in the mold to gaseous pressure, causing the final reaction between the ingredients to ensue in the mold, and at the same time while maintaining the gaseous pressure revolving the mold at a high rate of speed to spread the substance uniformly over the mold surface and also to counteract the tension of dissociation in the substance during its reaction by centrifugal force, and continuing the operation until the final non-plastic cast is formed, substantially as described.

2. The method of molding sound records and other objects of substances non-plastic in their final condition consisting in heating a revoluble mold containing in fluid condition substances which react on application of heat to form substances which in their final stage are non-plastic at such temperatures as may be employed without injury to the substance or mold, subjecting the substance in the mold to gaseous pressure and at the same time revolving the mold at a high rate of speed to spread the substance uniformly over the mold surface and also to counteract the tension of dissociation in the substance during its reaction by centrifugal force, and continuing the operation until the final non-plastic cast is formed, substantially as described.

3. The method of molding sound records and other objects of substances non-plastic in their final condition, consisting in introducing into a suitable rotatable mold a substance which reacts with formaldehyde on application of heat to form a substance which in its final stage is non-plastic at such temperatures as may be employed without injury to the substance or mold, introducing into the mold and substance a charge of compressed formaldehyde gas, sealing the mold, applying heat sufficient to cause the entire reaction to ensue in the mold and at the same time revolving the mold at a high rate of speed to spread the substance uniformly over the mold surface, and continuing the operation until the final non-plastic cast is formed, substantially as described.

4. The method of molding sound records and other objects of substances non-plastic in their final condition, consisting in introducing into a suitable rotatable mold a substance which reacts with formaldehyde on application of heat to form a substance which in its final stage is non-plastic at such temperatures as may be employed without injury to the substance or mold, subjecting the substance in the mold to formaldehyde gas under pressure, applying heat sufficient to cause reaction between the substance in the mold and the formaldehyde gas to ensue in the mold and at the same time while maintaining the gaseous pressure revolving the mold at a high rate of speed to spread the substance uniformly over the mold surface, and continuing the operation until the final non-plastic cast is formed, substantially as described.

5. The method of molding sound records and other objects of substances non-plastic in their final condition, consisting in introducing into a suitable rotatable mold a substance which reacts with an aldehyde on application of heat to form a substance which in its final stage is non-plastic at such temperatures as may be employed without injury to the substance or mold, introducing into the mold and substance a charge of an aldehyde gas under pressure, sealing the mold, applying heat sufficient to cause the entire reaction to ensue in the mold and at the same time revolving the mold at a high rate of speed to spread the substance uniformly over the mold surface, and continuing the operation until the final non-plastic cast is formed, substantially as described.

6. The method of molding sound records and other objects of substances non-plastic in their final condition, consisting in introducing into a suitable rotatable mold a substance which reacts with a substance containing the methylene radical on application of heat to form a substance which in its final stage is non-plastic at such temperatures as may be employed without injury to the substance or mold, introducing into the mold and substance a charge of compressed gas of a substance containing the methylene radical, sealing the mold, applying heat sufficient to cause the entire reaction to ensue in the mold and at the same time revolving the mold at a high rate of speed to spread the substance uniformly over the mold surface, and continuing the operation until the final non-plastic cast is formed, substantially as described.

7. The method of molding sound records and other objects of substances non-plastic in their final condition, consisting in introducing into a suitable rotatable mold a substance which reacts with an aldehyde on application of heat to form a substance which in its final stage is non-plastic at such temperatures as may be employed without injury to the substance or mold, subjecting the substance in the mold to an aldehyde gas under pressure, applying heat sufficient to cause reaction between the substance in the mold and the aldehyde gas to ensue in the mold, and at the same time while maintaining the gaseous pressure revolving the mold at a high rate of speed to spread the substance uniformly over the mold surface, and continuing the operation until the final non-plastic cast is formed, substantially as described.

8. The method of molding sound records and other objects of substances non-plastic in their final condition, consisting in introducing into a suitable rotatable mold ingredients which harden by chemical action on application of sufficient heat to form a substance which in its final stage is non-plastic, subjecting the ingredients in the mold to gaseous pressure and heat sufficient to cause the final reaction and at the same time revolving the mold at a high rate of speed to spread the substance uniformly over the mold surface and also to counteract the tension of dissociation in the substance during its reaction by centrifugal force, and continuing the operation until the final non-plastic cast is formed, substantially as described.

9. The method of molding sound records and other objects of substances non-plastic in their final condition, consisting in introducing into a suitable rotatable mold a substance which reacts with an aldehyde on application of heat to form a substance which in its final stage is non-plastic, subjecting the mass in the mold, with which is incorporated a condensing agent, to a charge of an aldehyde gas under pressure and to heat sufficient to cause reaction between the mass in the mold and the aldehyde gas and at the same time revolving the mold at a high rate of speed to spread the substance uniformly over the mold surface, and continuing the operation until the final non-plastic cast is formed, substantially as described.

10. The method of molding sound records and other objects of substances non-plastic in their final condition, consisting in introducing into a suitable rotatable mold a phenol and a condensing agent and subjecting the mass in the mold to a charge of an aldehyde gas under pressure and to heat sufficient to cause the final reaction and at the same time revolving the mold at a high rate of speed to spread the substance uniformly over the mold surface, and continuing the operation until the final non-plastic cast is formed, substantially as described.

This specification signed and witnessed this 28th day of April, 1909.

JONAS W. AYLSWORTH.

Witnesses:
DYER SMITH,
JOHN M. CANFIELD.